United States Patent
Hahn

(10) Patent No.: US 11,453,519 B2
(45) Date of Patent: Sep. 27, 2022

(54) METHOD AND DEVICE FOR FEEDING PRODUCTS FROM A FIRST PROCESS TO A SECOND PROCESS IN A PACKAGING PLANT

(71) Applicant: OPTIMA consumer GmbH, Schwäbisch Hall (DE)

(72) Inventor: Klaus Hahn, Schrozberg (DE)

(73) Assignee: OPTIMA consumer GmbH, Schwäbisch (DE)

( * ) Notice: Subject to any disclaimer, the term of this patent is extended or adjusted under 35 U.S.C. 154(b) by 0 days.

(21) Appl. No.: 17/277,591

(22) PCT Filed: Sep. 13, 2019

(86) PCT No.: PCT/EP2019/074564
§ 371 (c)(1),
(2) Date: Mar. 18, 2021

(87) PCT Pub. No.: WO2020/058135
PCT Pub. Date: Mar. 26, 2020

(65) Prior Publication Data
US 2021/0354866 A1   Nov. 18, 2021

(30) Foreign Application Priority Data
Sep. 18, 2018   (DE) .................. 102018215854.1

(51) Int. Cl.
*B65B 35/36*   (2006.01)
*B65B 57/14*   (2006.01)
(Continued)

(52) U.S. Cl.
CPC .............. *B65B 35/36* (2013.01); *B65B 57/14* (2013.01); *B65G 43/08* (2013.01); *B65G 47/082* (2013.01);
(Continued)

(58) Field of Classification Search
None
See application file for complete search history.

(56) References Cited

U.S. PATENT DOCUMENTS 8,973,735 B2   3/2015   Overley et al.
9,463,888 B2 *  10/2016   Overley ................. B65G 47/71
(Continued)

FOREIGN PATENT DOCUMENTS

| JP | 2000142625 A | 5/2000 |
| JP | 2012031454 A | 2/2012 |
| WO | 2006/015657 A1 | 2/2006 |

*Primary Examiner* — William R Harp
(74) *Attorney, Agent, or Firm* — Akerman LLP

(57) ABSTRACT

The invention relates to a method and to a device for feeding products (2) from a first process to a second process in a packaging plant, wherein a buffer device (3) is provided between the first process and the second process, wherein the products (2) from the first process are in each case provided in groups with a variable first placing pattern, the method comprising the following steps: a) detecting the first placing pattern of a group (21, 23) of products (2) to be relocated, b) providing a number of conveying units (33), disposed in the detected first placing pattern, at the receiving position (30) of the buffer device (3), and c) collectively relocating the group (21, 23) of products with the detected placing pattern into the conveying units (33) of the buffer device (3) that are provided at the receiving position (30).

10 Claims, 6 Drawing Sheets

Figure 1:
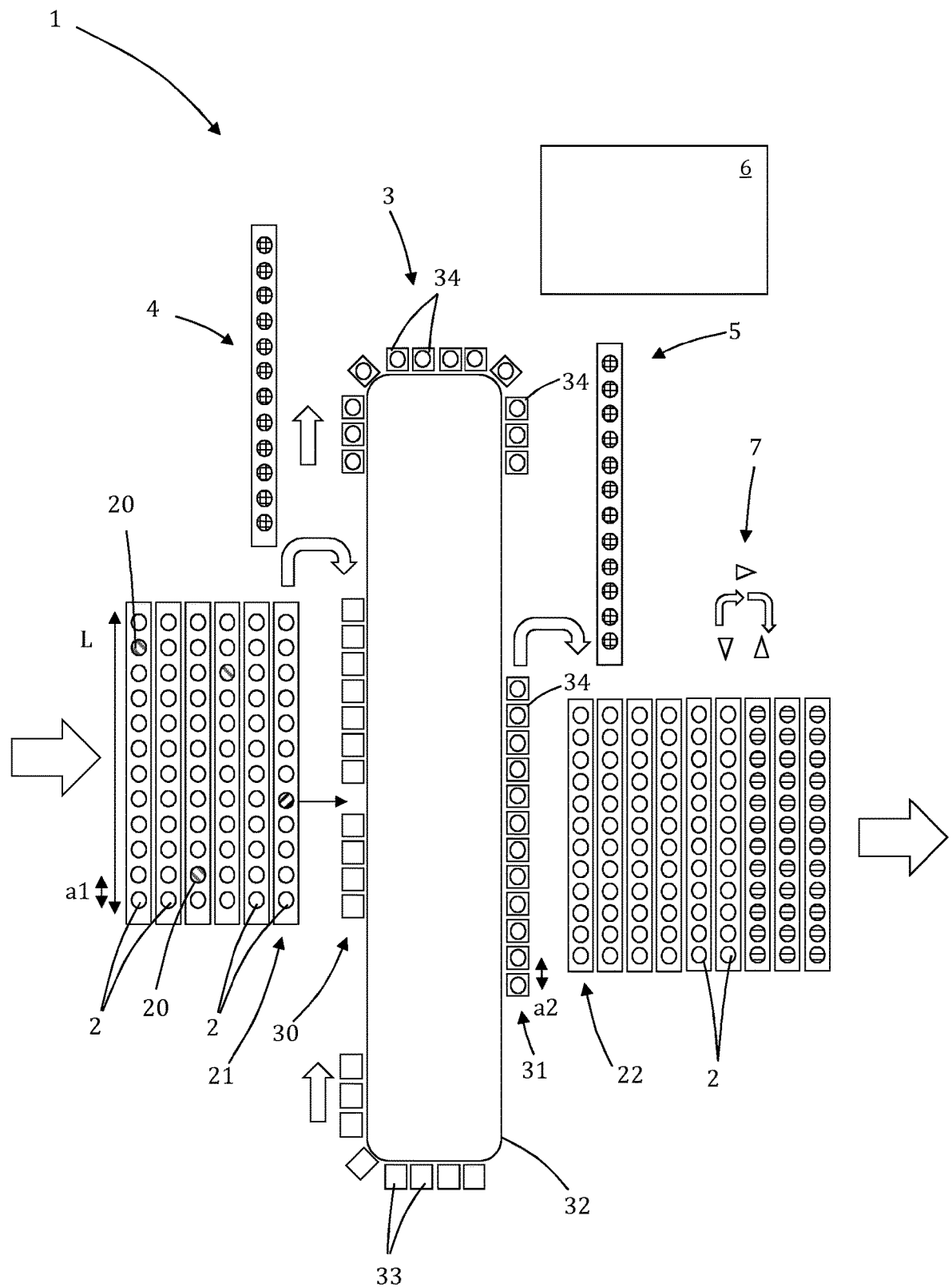

(51) Int. Cl.
*B65G 43/08* (2006.01)
*B65G 47/08* (2006.01)
*B65G 47/256* (2006.01)
*B65G 47/51* (2006.01)

(52) U.S. Cl.
CPC ....... *B65G 47/256* (2013.01); *B65G 47/5127* (2013.01)

(56) References Cited

U.S. PATENT DOCUMENTS

| | | | |
|---|---|---|---|
| 9,969,565 B1 * | 5/2018 | Simm | B65B 35/38 |
| 10,112,776 B2 * | 10/2018 | Rasi | B65G 47/841 |
| 2015/0158611 A1 | 6/2015 | Kalany et al. | |
| 2015/0375878 A1 | 12/2015 | Overley et al. | |

* cited by examiner

METHOD AND DEVICE FOR FEEDING PRODUCTS FROM A FIRST PROCESS TO A SECOND PROCESS IN A PACKAGING PLANT

CROSS-REFERENCE TO RELATED APPLICATIONS

This application is a national phase of PCT/EP2019/074564, filed Sep. 13, 2019, and claims priority to German Patent Application No. 10 2018 215 854.1, filed Sep. 18, 2018, the entire contents of both of which are hereby incorporated by reference.

FIELD OF APPLICATION AND PRIOR ART

The invention relates to a method and to a device for feeding products from a first process to a second process in a packaging plant.

Various processes, such as filling, closing or cartoning, for example, are carried out in a packaging plant. It is known for separate machines or modules to be provided for each of the individual processes. Products or precursors (hereunder generally referred to as products) are conveyed according to the requirements in each machine or each module.

Before, during or after the individual processes, the products are conveyed at a conveying speed and arrangement that is typically determined by the process. The individual processes herein may render different conveying speeds or arrangements of the products necessary or expedient.

OBJECT AND SOLUTION

It is the object of the invention to provide a method and a device for feeding products from a first process to a second process in a packaging plant, wherein the products from the first process are provided with a first placing pattern, and wherein at least the first placing pattern is variable.

According to a first aspect, a method for feeding products from a first process to a second process in a packaging plant is provided, wherein a buffer device is provided between the first process and the second process, wherein the buffer device has a closed conveying section having a receiving position for receiving products in receiving groups from the first process, and having a transfer position for transferring products in transfer groups to the second process, and a plurality of conveying units which at least in portions along the conveying section can be driven in a mutually independent manner, and wherein the products from the first process are in each case provided in receiving groups with a variable first placing pattern, the method comprising the following steps a) providing empty conveying units for receiving the receiving groups at the receiving position of the buffer device, wherein conveying units which in terms of their number and arrangement correspond to the associated first placing pattern are provided for each receiving group to be relocated, b) displacing loaded conveying units along the buffer device downstream of the receiving position so as to form a product stream while ungrouping the receiving groups, and c) providing loaded conveying units at the transfer position of the buffer device, wherein loaded conveying units which in terms of their number and arrangement correspond to an associated second placing pattern are provided for each transfer group to be relocated.

According to a second aspect, a device for feeding products from a first process to a second process in a packaging plant is provided, wherein the products from the first process can be provided in receiving groups with a variable first placing pattern, said device comprising a buffer device which is provided between the first process and the second process, wherein the buffer device has a closed conveying section having a receiving position for receiving products in receiving groups from the first process, and having a transfer position for transferring products in transfer groups to the second process, and a plurality of conveying units which at least in portions along the conveying section can be driven in a mutually independent manner, and a control installation which is specified and configured for actuating the conveying units such that a) empty conveying units for receiving the receiving groups can be provided at the receiving position of the buffer device, wherein conveying units which in terms of their number and arrangement correspond to the associated first placing pattern can be provided for each receiving group to be relocated, b) loaded conveying units can be displaced along the buffer device downstream of the receiving position so as to form a product stream while ungrouping the receiving groups, and c) loaded conveying units can be provided at the transfer position of the buffer device, wherein loaded conveying units which in terms of their number and arrangement correspond to an associated second placing pattern can be provided for each transfer group to be relocated.

According to the invention, conveying units for each relocating procedure of one receiving group from the first process to the buffer device are provided only at those locations of the receiving position where a product is to be received. The conveying units are subsequently individually displaced such that a product stream is formed, wherein the assignment of the products to one receiving group is cancelled. Transfer groups for the subsequent second process can then be formed from the product stream.

Exactly one receiving position and exactly one transfer position are provided in one design embodiment. In other design embodiments, more than one receiving position and/or more than one transfer position are provided. A design having a plurality of transfer positions herein can be advantageous in particular, for example so as to transfer products from a first process operating at a higher rate to a slower second process, wherein the processing by the second process takes place in multiple tracks.

In one design embodiment, the conveying units each have dedicated drives. In other design embodiments, the conveying units are passive units, wherein the conveying section is actuated so as to apply to the conveying units driving forces in order for the conveying units to be moved along the conveying section. The conveying section and the conveying units particularly preferably form linear motors, wherein the conveying section has a stator device and the conveying units each have one or a plurality of permanent magnets. A design of the buffer device in such a manner as a linear motor system has the advantage that the conveying units can be individually and precisely actuated. Moreover, tracing of products is possible on account of the products being displaced in conveying units such that it can be established in which transfer groups products from a specific receiving group have been transferred, despite the receiving groups being cancelled.

It is obvious to the person skilled in the art that the invention is not limited to two processes and, in deviating design embodiments, more than one process feeds products to the buffer device and/or products from the buffer device are transferred to more than one process. Likewise, the definitions "first" and "second" serve only for differentiating the individual components or processes and characterize neither any relevance nor any order of the components or processes.

In one design embodiment, the receiving groups and/or the transfer groups are relocated in groups, for example by means of a gripping installation. On account of the conveying units being provided in a variable manner so as to correspond to the variable first placing pattern at the receiving position, group-wise relocating is possible without empty conveying units, that is to say conveying units without any picked-up product making their way into a region downstream of the receiving position, to the transfer position of the device and thus to the second process. Likewise, group-wise relocating of the products provided in the conveying units to the second process is possible in groups in the case of a variable second placing pattern without products being relocated at positions in the second process where no products are desired.

In advantageous design embodiments, all first placing patterns of the groups of products provided by the first process can be represented by a matrix having at least one column and at least one row, wherein, depending on the current placing pattern, all positions of the matrix are occupied, or individual or a plurality of positions of the matrix have a gap. Group-wise relocating of the products herein is possible by means of a gripping installation, for example, which has one gripping unit for each position of the matrix. If no product is disposed at a position of the matrix, this does not affect a relocation procedure of the remaining products of the group. Depending on the embodiment, the gripping installation carries out, for example, a linear movement, a rotary movement, or a combined movement, for relocating the group of products. It is also conceivable herein that the group of products is distorted while being relocated, that is to say that a spacing of the products within the group is varied.

In one design embodiment, defective products are ejected before or when being transferred to the buffer device, wherein the first placing pattern has a gap at the position of the products ejected or to be ejected. In one design embodiment herein it is provided that the products to be ejected are gripped conjointly with the products to be relocated. The products to be ejected, when relocating the first group of products, are repositioned to a location at the receiving position where no conveying unit is provided, so that the products can be rejected under the influence of gravity. In other design embodiments, the products are ejected prior to being relocated, wherein the gripping unit assigned to that position grips into a "void".

In one design embodiment, the products are provided by the first process so that the products as a stream are individually disposed behind one another in the conveying direction, wherein in one design embodiment a receiving group is captured as a receiving group of products that are disposed behind one another in the conveying direction and is relocated to the buffer device. In advantageous design embodiments, the first process provides the products so as to be in rows disposed behind one another in a conveying direction, wherein the receiving group comprises at least one row. In one design embodiment, the receiving group comprises exactly one row, wherein products to be ejected or gaps by virtue of products already ejected may be present at individual positions of the row.

In another design embodiment, the receiving groups of products comprises N rows, where N is greater than or equal to two, wherein the conveying units at least at the receiving position are disposed in N tracks and the N rows are relocated into the conveying units disposed in N tracks. In one design embodiment, the conveying section across the entire profile has N tracks, wherein relocating from the N tracks to N subsequent processes or in transfer groups having N rows is conceivable. In other design embodiments, the N tracks are at least partially converged.

In one design embodiment, a number of products in the transfer group to the second process corresponds to a nominal number of products in the receiving group, wherein any potential gaps in the placing pattern of the receiving group are closed when the conveying units are moved along the conveying section. In other design embodiments, the at least one transfer group of products is provided with a variable second placing pattern.

The first placing pattern and the second placing pattern may deviate from one another. In one design embodiment, the products in the receiving group and the transfer group are in each case disposed in one row, wherein the rows are of identical length, but at least one group has a gap at regular or irregular spacings. In other design embodiments, the products in the receiving group and the transfer group are disposed in rows of dissimilar length. The loaded conveying units are at least temporarily moved individually along the conveying section so as to enable the products from the first placing pattern to convert to the second placing pattern. The products herein are preferably conveyed along the conveying section in a continuous product stream.

The method and/or the device can be advantageously used for linking various processes in one packaging plant. For example, the method and/or the device can be used in the production and packaging of beverage capsules, comprising a capsule-filling machine and a cartoner. A first process herein is carried out by means of the capsule-filling machine. Filled and closed capsules are provided by the capsule-filling machine. The products are provided in rows disposed behind one another in a conveying direction, for example. It is an objective that correctly filled and closed capsules are exclusively supplied to the cartoner. In order for this to be guaranteed, the products are checked prior to being transferred and when substandard refused before or when being transferred to the buffer device, for example. In this case, a placing pattern of the receiving group of products has gaps. Group-wise relocating to the buffer device without empty conveying units being transported from the receiving position to the transfer position of the buffer device and leading to undesirable flaws in subsequent processes is possible by providing the conveying units so as to correspond to a placing pattern.

When cartoning, the capsules can be converted to an individual placing pattern, depending on the packaging requirements. This is possible in an effective manner since the products fed from the capsule-filling machine are converted to a flawless reproducible order in the buffer device.

SHORT DESCRIPTION OF THE FIGURES

Figure 2:
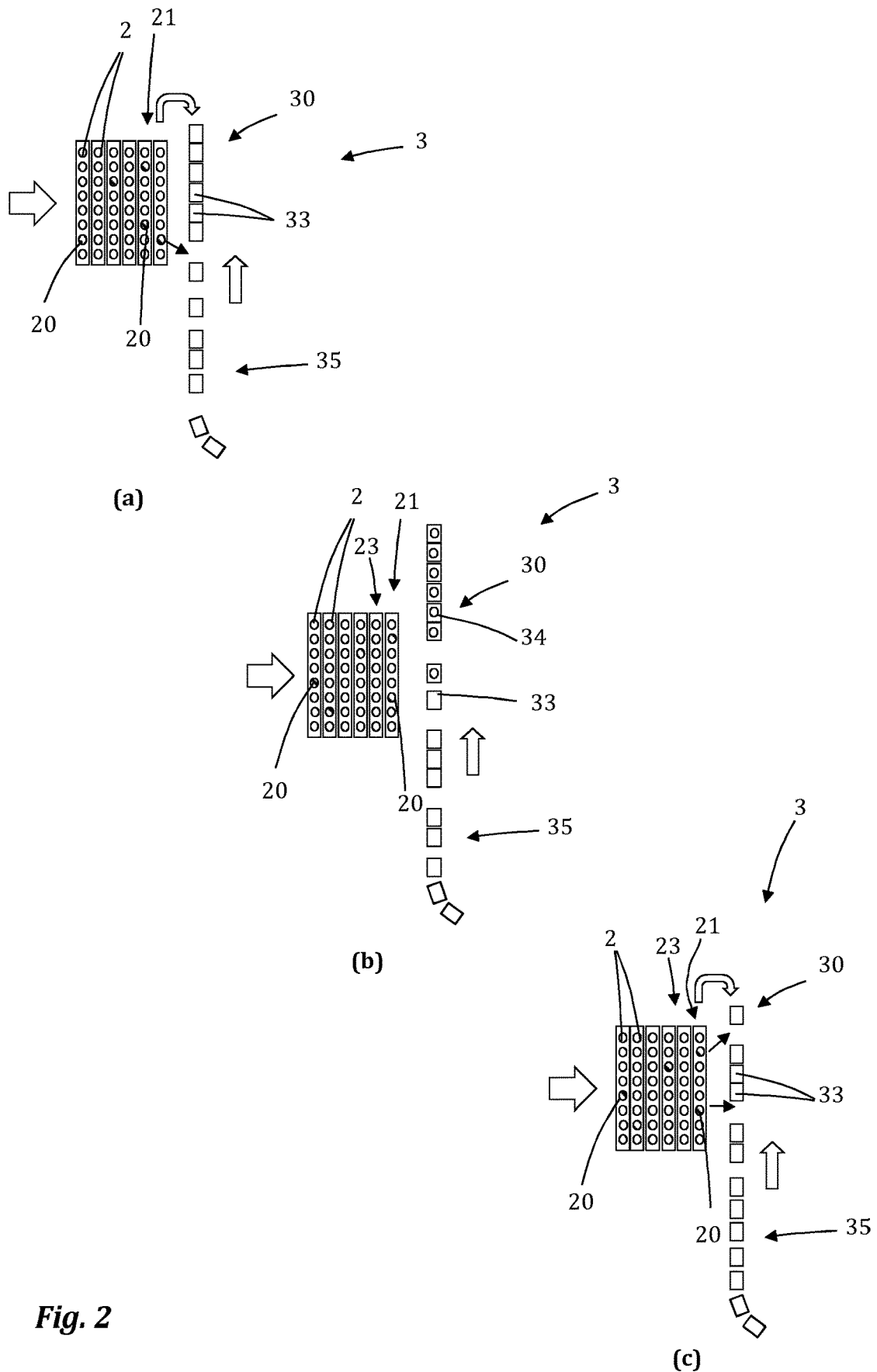
Figure 3:
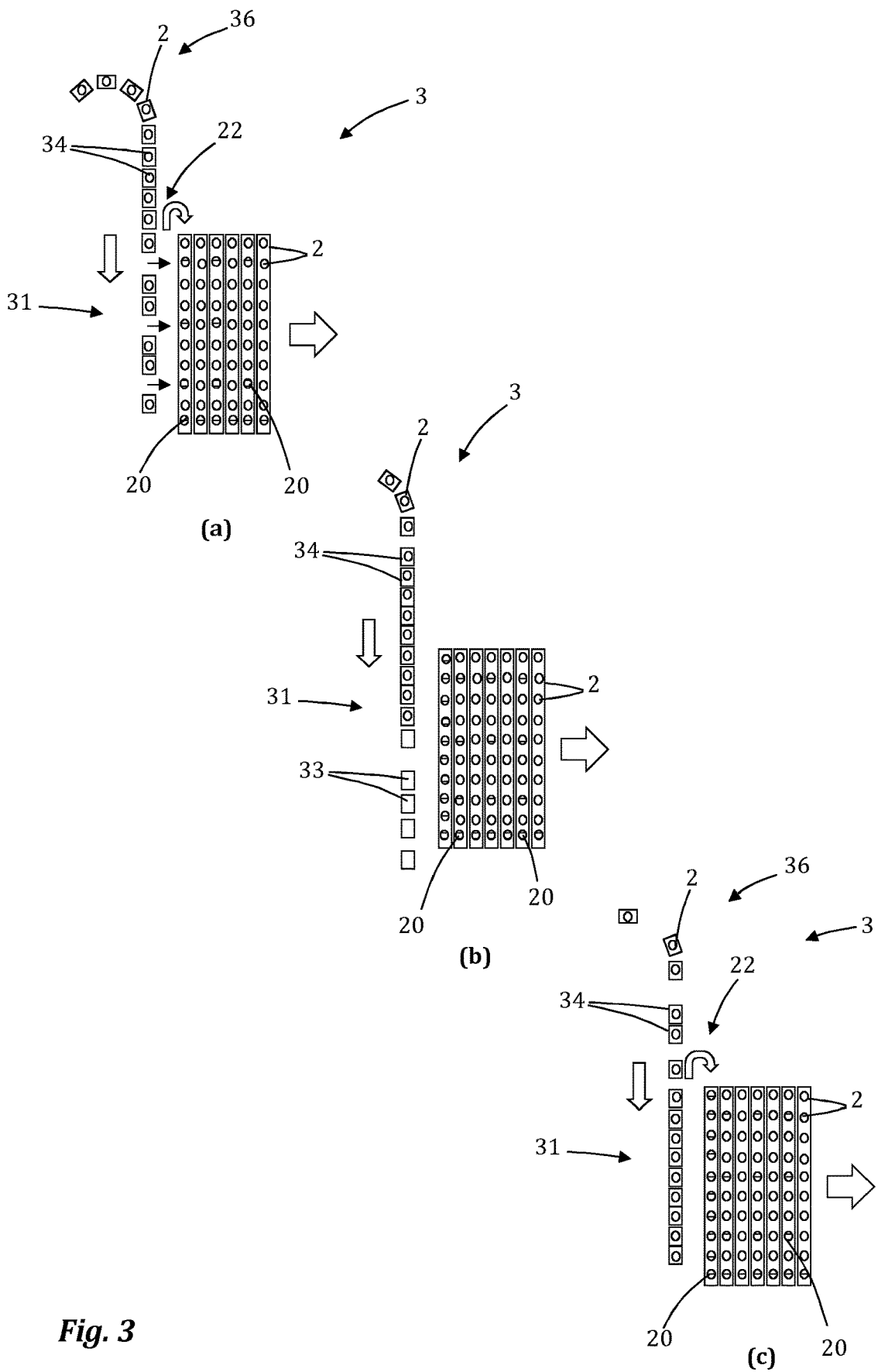
Figure 4:
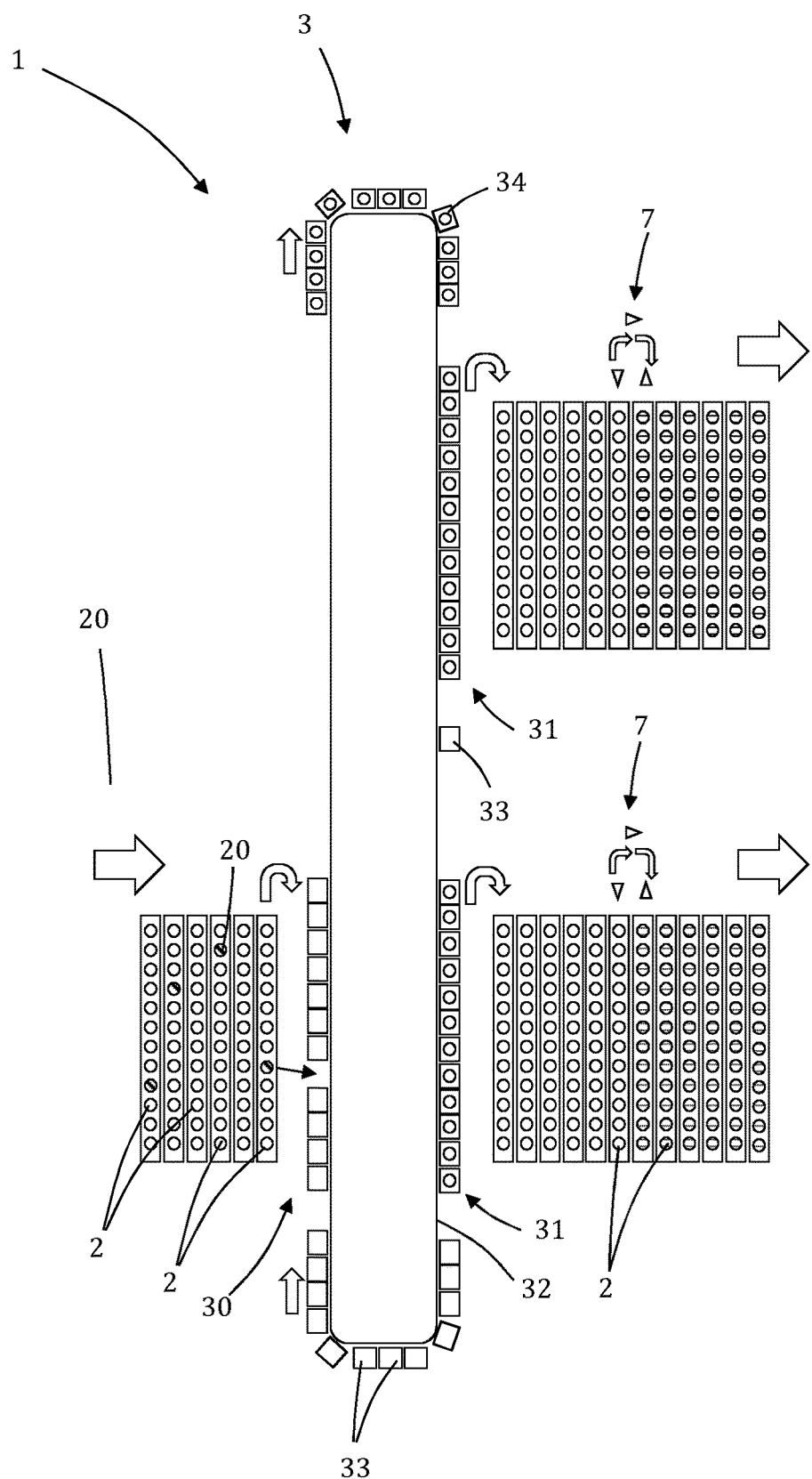
Figure 5:
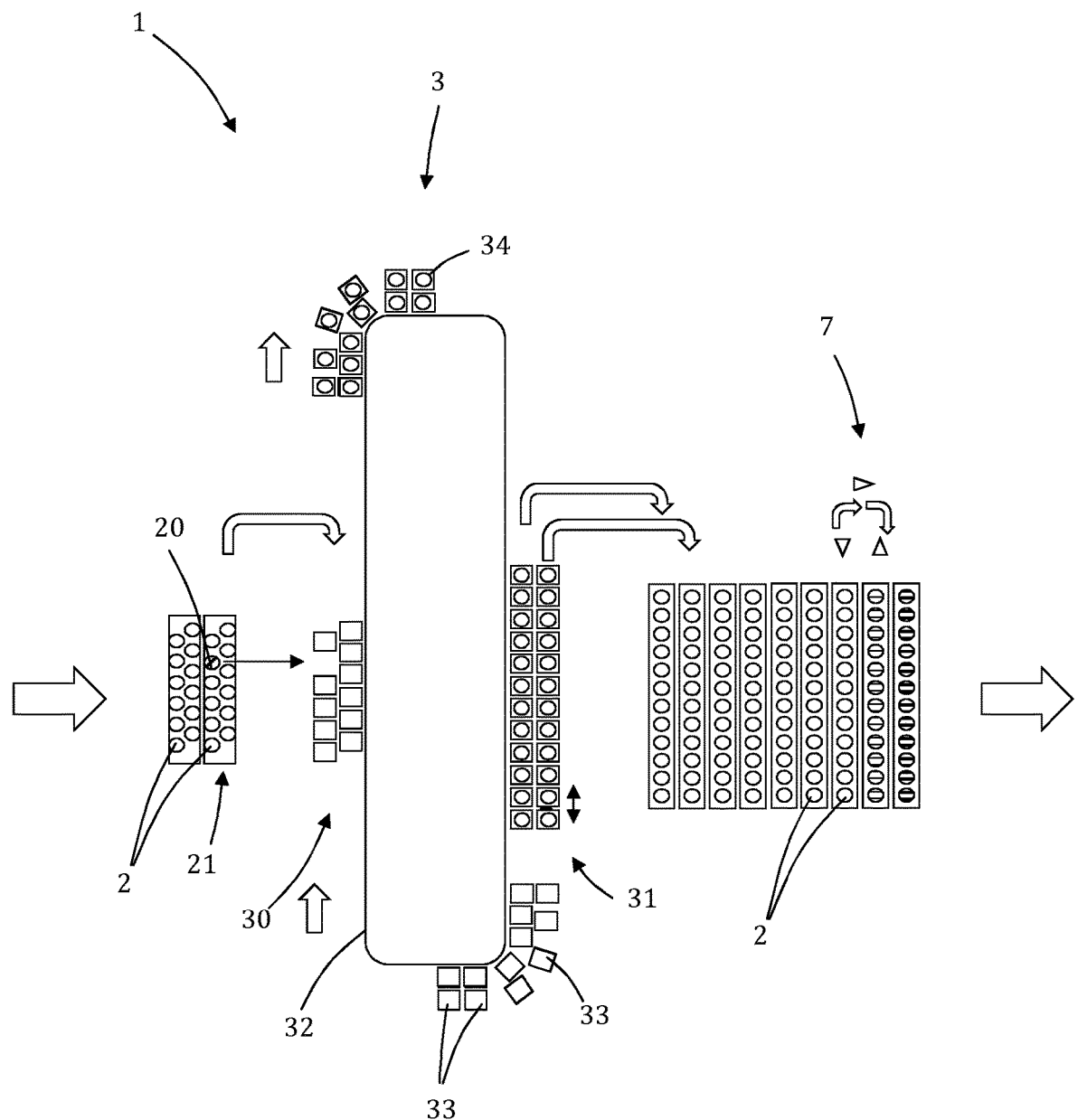
Figure 6:
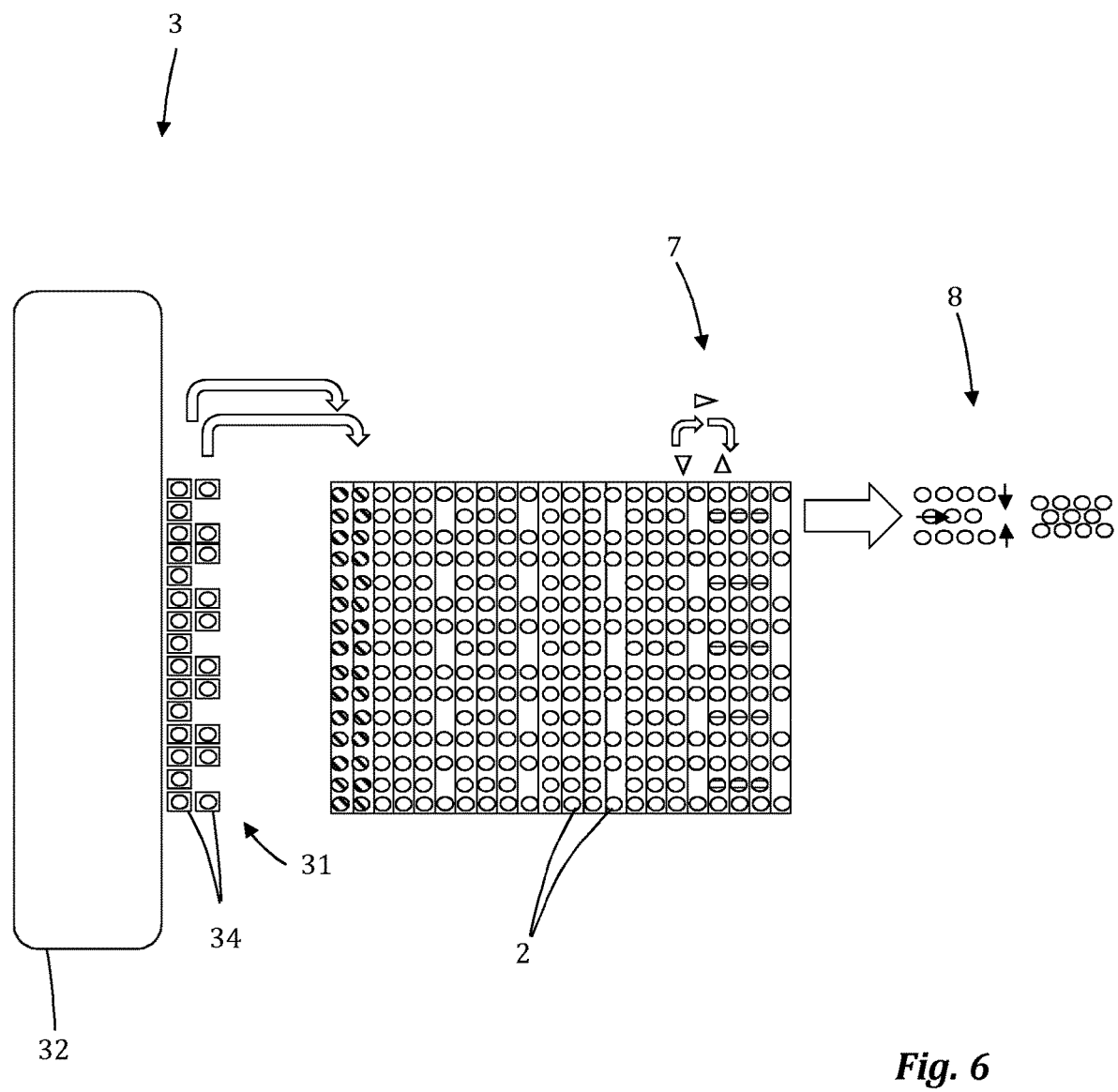

Further advantages and aspects of the invention are derived from the claims and from the description hereunder of preferred exemplary embodiments of the invention which are explained hereunder by means of the figures, in which:

FIG. 1 schematically shows a first exemplary embodiment in a device for feeding products from a first process to a second process in a packaging plant having a buffer device;

FIG. 2 schematically shows the steps of a method for feeding products from a first process to a buffer device;

FIG. 3 schematically shows the steps of a method for feeding products from a buffer device to a second process;

FIG. 4 schematically shows a second exemplary embodiment of a device for feeding products from a first process to a second process in a packaging plant having a buffer device;

FIG. 5 schematically shows a third exemplary embodiment of a device for feeding products from a first process to a second process in a packaging plant having a buffer device; and FIG. 6 shows a detail of a device similar to that of FIG. 5.

DETAILED DESCRIPTION OF THE EXEMPLARY EMBODIMENTS

FIG. 1 schematically shows a device 1 for feeding products 2 from a first process to a second process in a packaging plant. The device comprises a buffer device 3 which is provided between the first process and the second process, a first gripping installation 4 for relocating products 2 from the first process to the buffer device 3, a second gripping installation 5 for relocating products 2 from the buffer device 3 to the second process, and a control installation 6. A reversing installation 7 for the products 2 designed as capsules is furthermore provided in the exemplary embodiment illustrated.

The buffer device 3 comprises a closed conveying section 32 having a receiving position 30 for receiving products 2 from the first process, and a transfer position 31 for transferring products 2 to the second process, as well as a plurality of conveying units 33, 34 which at least in portions along the conveying section 32 can be driven in a mutually independent manner. The conveying units 33, 34 preferably can be driven in a mutually independent manner along the entire conveying section 32. The illustrated number of conveying units 33, 34 herein is only exemplary.

In the exemplary embodiment illustrated, the products 2 from the first process are provided in rows disposed behind one another. A maximum of twelve products 2 are provided in each row in the exemplary embodiment. However, the length L of the rows indicated by a double arrow is only exemplary. The products 2 in the rows are disposed at a spacing a1.

Groups of products 2 that are provided by the first process are referred to as receiving groups 21. The receiving groups 21 in the exemplary embodiment illustrated comprise in each case one row. These groups by means of the gripping installation 4 are transferred to the buffer device 3. The arrangement of the products 2 in one receiving group 21, that is to say in one row in the exemplary embodiment illustrated, is referred to as a placing pattern or first placing pattern. The placing pattern herein may vary between the receiving groups 21 that are to be successively relocated. In particular, defective products which are therefore to be ejected, or gaps 20 at positions of already ejected products 2, can be present in the rows.

The placing pattern of the next receiving group 21 of products 2 to be relocated is known by virtue of preceding checking processes and is transmitted to the control installation 6 or is detected by means of the control installation 6. A corresponding number of empty conveying units 33 that are disposed in the detected placing pattern are provided in a positionally correct manner at the receiving position 30 of the buffer device 3 by means of the control installation 6. The receiving group 21 to be relocated is subsequently gripped by means of the first gripping installation 4, and the products 2 of the receiving group 21 are collectively relocated into the empty conveying units 33 of the buffer device 3 that are provided at the receiving position 30.

The conveying units 34 loaded in such a manner are subsequently moved to the transfer position 31 for the second process, wherein the receiving groups 21 are ungrouped while forming a product stream. Loaded conveying units 34 for the second process are provided at the transfer position 31. The groups of products provided for the second process are referred to as transfer groups 22. In order to be relocated, one transfer group 22 is in each case gripped and transferred by means of the second gripping installation 5.

A placing pattern of the transfer group 22 is referred to as the second placing pattern. The loaded conveying units 34 in terms of their number and arrangement are provided so as to correspond to this second placing pattern.

The second placing pattern in the exemplary embodiment illustrated remains unchanged or constant for successive transfer groups 22. In other design embodiments, the second placing pattern can likewise vary between the groups to be relocated. In the exemplary embodiment comprises in each case twelve products 2 disposed in one row. However, the second placing pattern illustrated is likewise only exemplary.

Gaps in the first placing pattern herein can be compensated for on account of the loaded conveying units 34 being individually transported between the receiving position 30 and the transfer position 31 such that twelve conveying units 34 with products are in each case provided at the transfer position 31.

In other design embodiments, the maximum number of products 2 in the second placing pattern and the maximum number of products 2 in the first placing pattern are chosen so as to be dissimilar.

The arrangement of the products 2 for the second process in the exemplary embodiment illustrated is more compact, that is to say that a spacing a2 of the products 2 is smaller than the spacing a1 in the first process. Repositioning of the products in the longitudinal direction of the rows herein takes place while relocating from the buffer installation 2 to the second process, for example.

FIG. 2 schematically shows a potential sequence when relocating the products 2 from the first process to the buffer device 3 which is only partially illustrated in FIG. 2.

Firstly, the first placing pattern of a receiving group 21 of products 2 of the first process that is to be subsequently relocated is detected. A detection herein is possible immediately when the transfer position of the first process is reached or already at an earlier point in time. As is illustrated in FIG. 2a, a required number of conveying units 33, corresponding to the detected placing pattern of the receiving group 21 to be relocated, is positioned at a preliminary position 35 ahead of the receiving position 30.

As is illustrated in FIG. 2b, the loaded conveying units 34 upon being released are moved away from the receiving position 30. The conveying units 33 are moved from the preliminary position 35 to the receiving position 30 simultaneously or with a temporal offset. At this point in time, data pertaining to a placing pattern of the subsequent receiving group 23 is preferably already available at the control unit 6; for example, the first placing pattern of the subsequent receiving group 23 has been detected optically and/or by means of a weighing installation such that the empty conveying units 33 for the receiving group 23 to be subsequently relocated can be correspondingly positioned at the preliminary position 35.

As is illustrated in FIG. 2c, the receiving group 21 to be relocated is relocated as soon as the conveying units 33 have been provided at the receiving position. The conveying units 33 for the subsequent receiving group 23 are at the preliminary position 35. A first placing pattern for a further receiving group can be detected or evaluated by the control unit 6, and the sequence can be correspondingly repeated.

Moving the empty conveying units 33 to the receiving position 30 and relocating the groups herein can be adapted to a conveying speed of the first process.

FIG. 3 schematically shows a potential sequence when relocating the products 2 from the buffer device 3, only partially illustrated in FIG. 3, to the second process. In the sequence illustrated in FIG. 3, the products 2 are transferred to the second process with a variable second placing pattern.

To this end, the products 2 in the loaded conveying units 34 are positioned in a desired placing pattern in the transfer position 31, as is illustrated in FIG. 3a, and the transfer group 22 thus formed is relocated. The conveying units 34 having the products 2 at a preliminary position 36 herein are already positioned so as to correspond to the second placing pattern for a transfer group to be subsequently relocated.

As is illustrated in FIG. 3b, the unloaded conveying units 33 upon being released are moved away from the transfer position 31. The loaded conveying units 34 are moved from the preliminary position 36 to the transfer position 31 simultaneously or temporally offset. In advantageous design embodiments, the second placing pattern of the subsequent transfer group 22 is already known at this point in time, such that the loaded conveying units 34 for the transfer group 22 to be subsequently relocated can be correspondingly positioned at the preliminary position 36.

As is illustrated in FIG. 3c, the transfer group 22 of products 2 is relocated as soon as the conveying units 34 have been provided at the transfer position 31. The conveying units 34 loaded with products 2 for the subsequent group are at the preliminary position 36.

The second placing pattern in the exemplary embodiment illustrated in FIG. 3 varies according to a regular pattern. However, irregular patterns are also conceivable.

FIG. 4 schematically shows a second exemplary embodiment of a device 1 for feeding products 2 from a first process to a second process in a packaging plant. The device 1 illustrated in FIG. 4 corresponds substantially to the device 1 illustrated in FIG. 1, and uniform reference signs are used for identical components. A repetition of the description of components already described will be dispensed with. The device 1 according to FIG. 4 comprises a buffer device 3 as well as gripping installations 4, 5, not illustrated for reasons of clarity in FIG. 4, and a control installation 6 which is likewise not illustrated.

As opposed to the exemplary embodiment illustrated in FIG. 1, the second process according to FIG. 4 is designed with two tracks such that the products 2 are transferred to the second process at two transfer positions 31. This is particularly advantageous when the first process can be operated at a significantly higher process speed. The first process is, for example, filling and closing of containers, in particular capsules, and the second process is cartoning of the products 2. In the exemplary embodiment illustrated herein, empty conveying units 33 are conveyed into a region between the two transfer positions 31. In other design embodiments, the groups for both transfer positions 31 are prepared at a common preliminary position, the groups simultaneously conveyed to both transfer positions 31, and upon being unloaded simultaneously conveyed into a region downstream of the downstream transfer position 31. In yet again other design embodiments, branch sections for a parallel movement of the empty and loaded conveying units 33, 34 are provided at the buffer device 31.

FIG. 5 schematically shows a third exemplary embodiment of a device 1 for feeding products 2 from a first process to a second process in a packaging plant. The device 1 illustrated in FIG. 5 likewise corresponds substantially to the device 1 illustrated in FIG. 1, and uniform reference signs are again used for identical components. The device 1 according to FIG. 4 comprises a buffer device 3 as well as gripping installations 4, 5, not illustrated for reasons of clarity in FIG. 4, and a control installation 6 which is likewise not illustrated.

As opposed to the exemplary embodiment illustrated in FIG. 1, the receiving groups 21 provided by the first process and to be relocated comprise in each case two mutually offset rows disposed behind one another in the conveying direction. The illustrated conveying section 32 herein has two parallel tracks such that the empty conveying units 33 can be disposed in two tracks at the transfer position 30, and the two rows of the receiving group 21 can be relocated into the empty conveying units 33 disposed in two tracks. The empty and loaded conveying units 33, 34 in each track herein can be displaced independently of the conveying units 33, 34 of the other track. On account thereof, potential gaps in the placing pattern can be compensated for individually for each track.

In order for the products 2 to be transferred to the second process, the loaded conveying units 34 in the exemplary embodiment illustrated in FIG. 5 are likewise disposed in two tracks. Relocating the products to the second process in the exemplary embodiment illustrated however takes place separately by means of two gripping units which are not illustrated and the movement of which is schematically illustrated by arrows. As is indicated by a double arrow, a spacing of the products 2 in one row is also varied herein. In other design embodiments, relocating the products to the second process likewise takes place in one transfer group having two rows. In yet again other design embodiments, the conveying section 32 has two tracks only in the region of the receiving position 30, wherein the tracks following the receiving position 30 are again converged so as to form one track, and the products 2 in the loaded conveying units 34 are provided in only one row at the transfer position 31, as is illustrated in FIG. 1.

FIG. 6 schematically shows a transfer position 31 of a buffer device 3 similar to that of FIG. 5, wherein products 2 in loaded conveying units 34 are provided in two tracks at the transfer position 31 of a conveying section 32. The loaded conveying units 34 in each track herein are disposed so as to correspond to a second placing pattern which can be individually configured for each relocation procedure.

In the second process schematically illustrated in FIG. 6, part of the products 2 is reversed by means of a reversing installation 7, and a packaging density of the products 2 is subsequently varied by means of a drafting installation 8.

In each of the exemplary embodiments illustrated it is possible for gaps in the placing patterns of the first process to be compensated for prior to the product being transferred to the second process and/or for gaps for the second process to be generated in the receiving groups received from the first process.

It is obvious to the person skilled in the art that the invention is not limited to the exemplary embodiments described. Rather, numerous modifications are conceivable. In particular, details of the exemplary embodiments illustrated in the figures can be combined or interchanged with one another in an arbitrary manner.

The device and the method in particular can be advantageously used for combining a capsule-filling machine and a (single-track or multi-track) cartoner. The device herein permits filled and closed plastic capsules to be relocated, as well as aluminum capsules which in terms of handling are more sensitive to be relocated. The device and the method by way of which a capsule-filling machine and a cartoner are linked to one another herein can be implemented with a small requirement in terms of space as well as with a high output.

The invention claimed is:

1. A method for feeding products from a first process to a second process in a packaging plant, wherein a buffer device is provided between the first process and the second process, wherein the buffer device has a closed conveying section having a receiving position for receiving products in receiving groups from the first process, and having a transfer position for transferring products in transfer groups to the second process, and a plurality of conveying units which at least in portions along the conveying section can be driven in a mutually independent manner, and wherein the products from the first process are in each case provided in receiving groups with a variable first placing pattern, wherein all first placing patterns of the receiving groups are represented by a matrix having at least one column and at least one row, wherein, depending on the current placing pattern, all positions of the matrix are occupied or individual or a plurality of positions of the matrix have a gap, the method comprising the following steps:
   a) providing empty conveying units for receiving the receiving groups at the receiving position of the buffer device, wherein conveying units which in terms of their number and arrangement correspond to the associated first placing pattern are provided for each receiving group to be relocated,
   b) displacing loaded conveying units along the buffer device downstream of the receiving position so as to form a product stream while ungrouping the receiving groups,
   c) providing loaded conveying units at the transfer position of the buffer device, wherein loaded conveying units which in terms of their number and arrangement correspond to an associated second placing pattern are provided for each transfer group to be relocated.

2. The method as claimed in claim 1, wherein the receiving groups and/or the transfer groups are relocated in groups.

3. The method as claimed in claim 1, wherein defective products are ejected before or when being transferred from the first process to the buffer device, and the first placing pattern has a gap at the position of the products ejected or to be ejected.

4. The method as claimed in claim 1, wherein the first process provides the products so as to be in rows disposed behind one another in a conveying direction, wherein the receiving groups provided by the first process comprise in each case at least one row, wherein the provided group of products comprises in particular in each case N rows, where N is greater than or equal to two, wherein the conveying units at least at the receiving position are disposed in N tracks and the N rows are relocated into the conveying units disposed in N tracks.

5. The method as claimed in claim 1, wherein the transfer group of products is provided with a variable second placing pattern.

6. A device for feeding products from a first process to a second process in a packaging plant, wherein the products from the first process can be provided in receiving groups with a variable first placing pattern, wherein all first placing patterns of the receiving groups of products can be represented by a matrix having at least one column and at least one row, wherein, depending on the current placing pattern, all positions of the matrix are occupied, or individual or a plurality of positions of the matrix have a gap, said device comprising
   a buffer device which is provided between the first process and the second process, wherein the buffer device has a closed conveying section having a receiving position for receiving products in receiving groups from the first process, and having a transfer position for transferring products in transfer groups to the second process, and a plurality of conveying units which at least in portions along the conveying section can be driven in a mutually independent manner, and
   a control installation which is specified and configured for actuating the conveying units such that
   a) empty conveying units for receiving the receiving groups can be provided at the receiving position of the buffer device, wherein conveying units which in terms of their number and arrangement correspond to the associated first placing pattern can be provided for each receiving group to be relocated,
   b) loaded conveying units can be displaced along the buffer device downstream of the receiving position so as to form a product stream while ungrouping the receiving groups, and
   c) loaded conveying units can be provided at the transfer position of the buffer device, wherein loaded conveying units which in terms of their number and arrangement correspond to an associated second placing pattern can be provided for each transfer group to be relocated.

7. The device as claimed in claim 6, wherein at least one gripping installation by means of which the receiving groups and/or the transfer groups can be relocated in groups is provided.

8. The device as claimed in claim 6, wherein, by means of the control installation, defective products can be detected and ejected before or when being transferred to the buffer device, wherein the first placing pattern has a gap at the position of the ejected products.

9. The device as claimed in claim 6, wherein the products by the first process are provided so as to be in rows disposed behind one another, wherein the receiving groups provided by the first process comprise in each case at least one row, wherein the receiving groups comprise in particular in each case N rows, where N is greater than or equal to two, wherein the conveying section at least at the receiving position has N tracks such that the conveying units can be disposed in N tracks at least at the transfer position, and the N rows can be relocated into the conveying units disposed in N tracks.

10. The device as claimed in claim 6, wherein the control installation is furthermore specified and configured for moving loaded conveying units with products between the receiving position and the transfer position so as to form a second groups of products, and for providing the second group of products at the transfer position, wherein the at least one second group of products in particular can be provided with a variable placing pattern at the transfer position.

* * * * *